Aug. 29, 1933.　　　　H. H. TALBOT　　　　1,924,333
ROLL MOUNTING
Filed Jan. 6, 1932　　　2 Sheets-Sheet 1

WITNESS
A. B. Wallace.

INVENTOR
Howard H. Talbot
By Brown & Critchlow
Attorneys

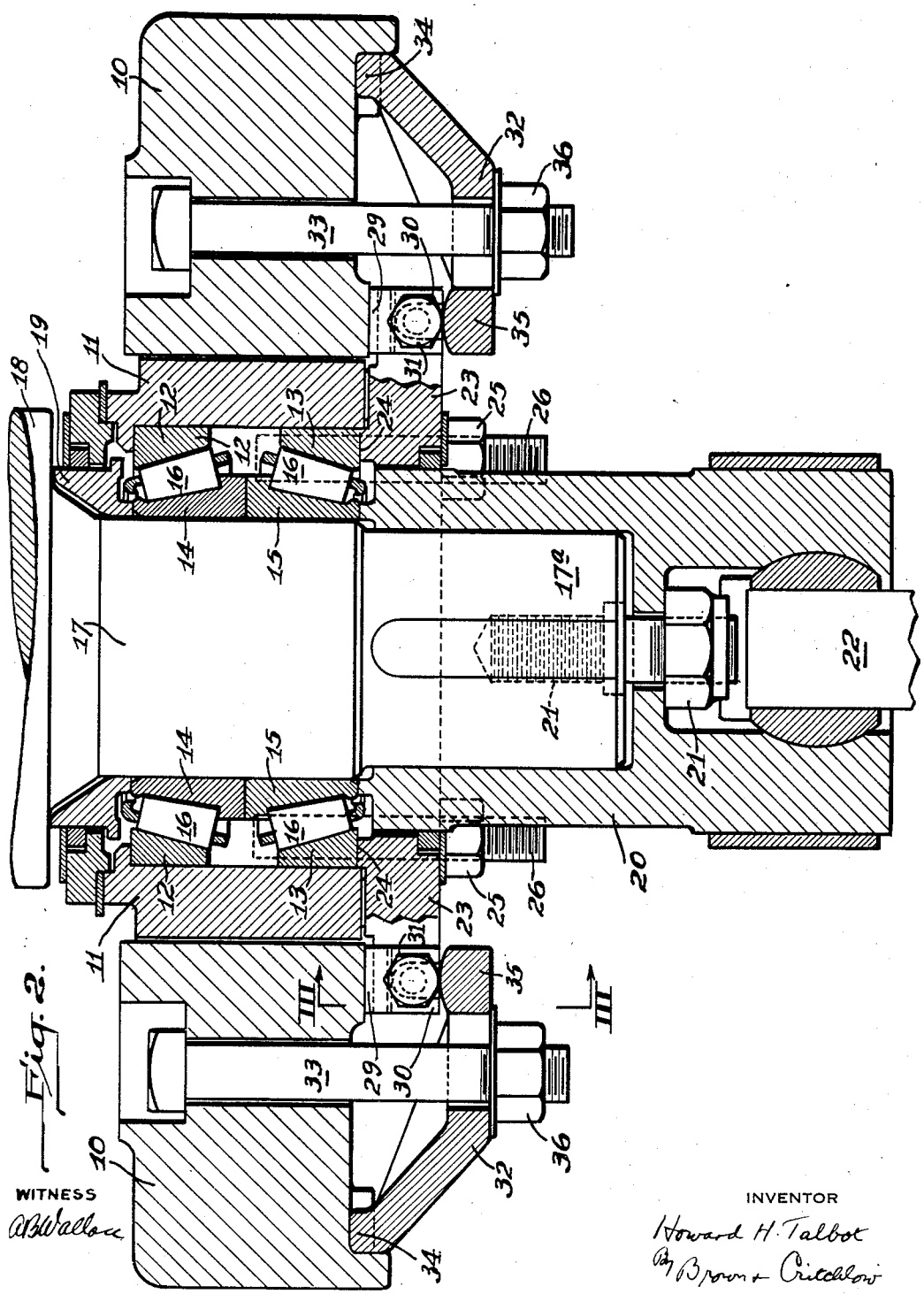

Patented Aug. 29, 1933

1,924,333

UNITED STATES PATENT OFFICE 1,924,333

ROLL MOUNTING

Howard H. Talbot, Pittsburgh, Pa., assignor to United Engineering & Foundry Company, Pittsburgh, Pa., a corporation of Pennsylvania Application January 6, 1932. Serial No. 584,971

4 Claims. (Cl. 80—56)

My invention pertains to mountings for the rolls of rolling mills, and relates especially to such mountings of the character in which provision is made for adjusting the roll transversely of the mill, for the purpose, for example, of bringing one of the rolls into accurate alignment with the other roll.

In mills for rolling metal it is common, of course, to provide means for adjusting the vertical position of one roll with respect to the other, so as to vary the "pass", or distance between the rolls. It is likewise common to provide means for adjusting one or more of the rolls transversely, or along the line of its axis. This is required in many cases, for instance when the rolls have grooves or the like which must match and be in alignment with each other. It is the object of my invention to provide an improved means for effecting this transverse adjustment of one of the rolls, a means that will be especially accurate in its effect and easy to operate, and which will be rugged and economical of construction.

A roll mounting constructed in accordance with my invention is shown, by way of example, in the accompanying drawings and described in the following specification, but it is to be understood that changes may be made in the construction thus described and shown, without exceeding the scope of the invention as defined in the appended claims.

In the drawings:

Fig. 2 is an enlarged section taken on the line II—II of Fig. 1; and

Figure 1:
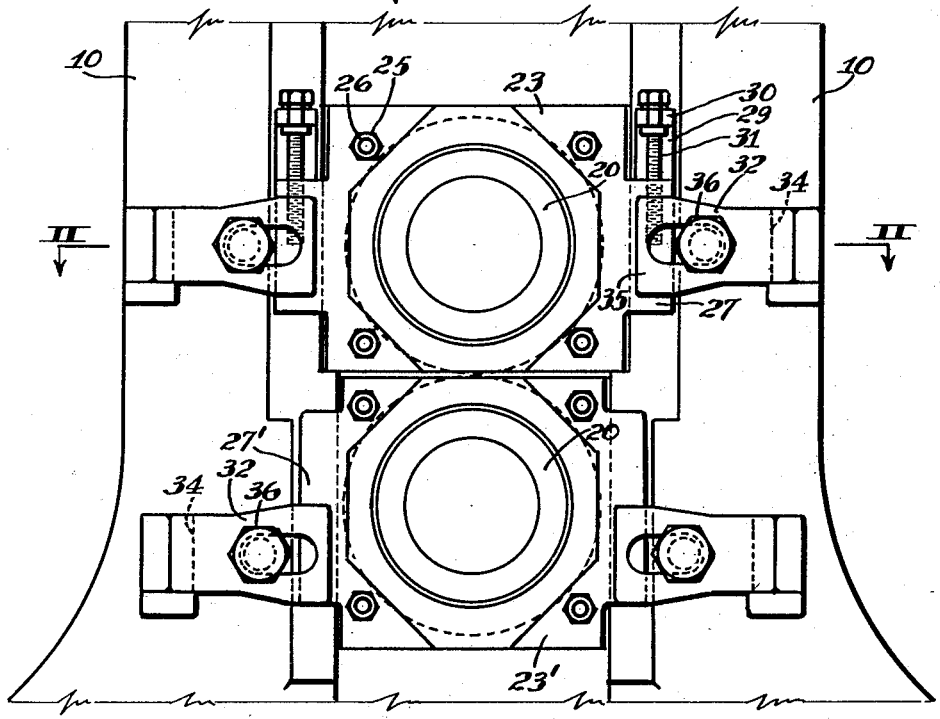
Fig. 1 is an end view of a portion of a rolling mill stand, showing the mountings for a pair of rolls.

The rolling mill stand comprises a pair of housings 10, one on each side thereof, in which are formed vertical guideways for slidably receiving the chocks 11 of the rolls in such manner that the chocks can be vertically adjusted with respect to each other in the well-known way, and also can be moved transversely in the guideways. In the drawings, only the housing and the chocks at one side of the stand are shown. The construction shown illustrates a mounting in which roller bearings are employed, and in that case outer races 12 and 13, inner races 14 and 15, and intermediate bearing rolls 16 are interposed between the chock and the neck 17 of the roll 18. A spacing ring 19 is disposed between the inner races 14 and the end of the roll. The roll neck is formed with an extension 17a upon which a sleeve 20 is secured by means of an axial screw 21 which passes centrally through the sleeve and enters the roll neck. Tightening of the screw causes the end of the sleeve to compress the inner races 14 and 15 and spacing ring 19 between itself and the end of the roll 18. The sleeve carries an appropriate universal connection for a shaft 22 for driving the roll.

An end cover plate 23 surrounds the inner end of the sleeve 20 and is tightened in place by means of nuts 25 threaded upon studs 26 which extend outward from the chock 11 and through the cover plate. The cover plate is formed with a shoulder 24 which engages against the outside race 13 when the nuts 25 are tightened. From this it will be seen that the roll, chock, roller bearing, sleeve and cover plate constitute together a unit which constitutes what may be termed a "chock device" and which can be moved either vertically or transversely in the guideways of the housing 10.

Figure 3:
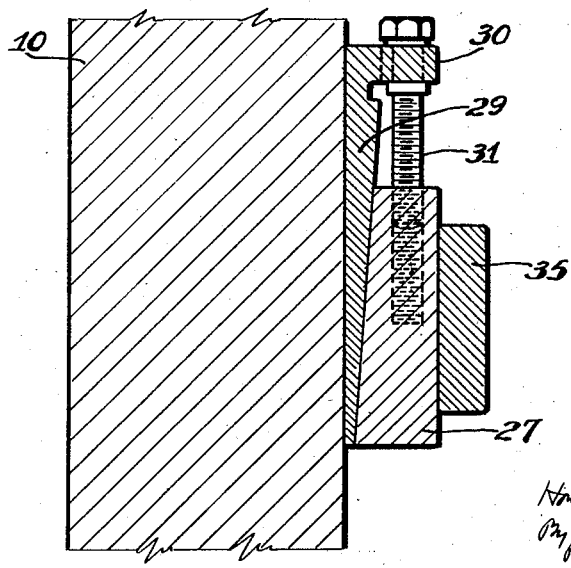
Fig. 3 is a detail section on the line III—III of Fig. 2.

The end cover plate 23 of the upper roll is formed with laterally extending elongated ears 27 the inner faces of which are beveled or inclined, as shown in Fig. 3. Between the inner face of each ear and the outer face of the housing 10 is interposed a wedge 29 having at the upper end thereof a lug 30 which is slotted to receive a screw 31 which is threaded into the ear and the head of which bears upon the top of the lug.

A pair of clamps are provided for engagement with the ears of the cover plate. Each of such clamps comprises a body portion 32 having therein a slot through which passes a bolt 33 carried by the housing. One end, 34, of the clamp engages the housing and the other end, 35, engages the ear of the cover plate. Thus by tightening the nut 36 on the bolt the cover plate will be forced towards the housing.

The mounting of the lower roll may be much the same as the upper roll except that the wedges 29 are omitted and the ears 27' of the cover plate 23' need not be formed with inclined inner faces. This is for the reason that there is ordinarily no occasion to make a transverse adjustment of the lower roll.

When it is desired to adjust one of the rolls (in this instance, the upper roll) transversely with respect to the other, the clamps are loosened and the screws 31 then turned in one direction or the other so as to raise or lower the wedges 29. This, of course, has the effect of changing the effective width of the ears 27 of the cover plate, so that the transverse position of the cover plate, and therefore of the other elements, including the roll, associated therewith, will be changed when the clamps are again tightened. It will be observed that adjustment of great nicety can be made easily and quickly in this manner, and that because of the elongation of the ears, permitting engagement of the clamps at various parts thereof, the adjustment is available irrespective of changes in the vertical position of the roll.

Of course the means for adjusting could be duplicated at the opposite end of the roll, if conditions occurred where such was desirable. However the chock on the opposite end of the roll will usually be left free for transverse movement, and in such circumstances it is only necessary to provide the adjusting device at one end of the roll.

I claim:

1. A roll mounting comprising a housing, a chock device for said roll mounted in said housing for movement in the direction of the axis of the roll, a wedge disposed between said chock device and said housing, means for adjusting the position of said wedge, thereby to adjust the position of said chock device in the direction of the axis of the roll, and a clamp for pressing said chock against said wedge.

2. A roll mounting comprising a housing, a chock device movable with respect to said housing and having a projection disposed opposite a portion of said housing, a wedge disposed between said projection and said housing, and a clamp for forcing said projection against said wedge.

3. A roll mounting comprising a housing, a chock movably mounted in said housing, a roll having the neck thereof disposed in said chock, a bearing interposed between said chock and said roll neck, and a cover plate fixedly associated with said roll neck and engaging a portion of said bearing, said cover plate having a projection disposed opposite a portion of said housing, a wedge disposed between said projection and said housing, and means for pressing said projection against said wedge.

4. A roll mounting comprising a housing, a chock movably mounted in said housing, a roll having the neck thereof disposed in said chock, a bearing interposed between said chock and said roll neck, and a cover plate fixedly associated with said roll neck and engaging a portion of said bearing, said cover plate having a projection disposed opposite a portion of said housing, a wedge disposed between said projection and said housing, a clamp engaging at one end against said projection and at the other end against said housing, and means for tightening said clamp.

HOWARD H. TALBOT.